May 3, 1966     J. H. BOICEY     3,249,479
PRESSING GLASS-PLASTIC SANDWICHES
Filed Oct. 21, 1957     2 Sheets-Sheet 1
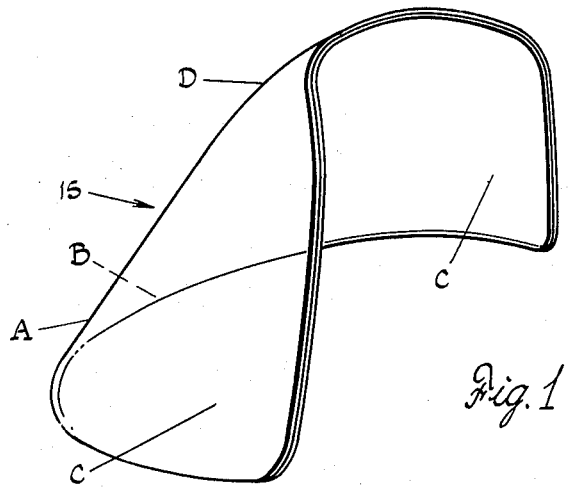
Fig. 1
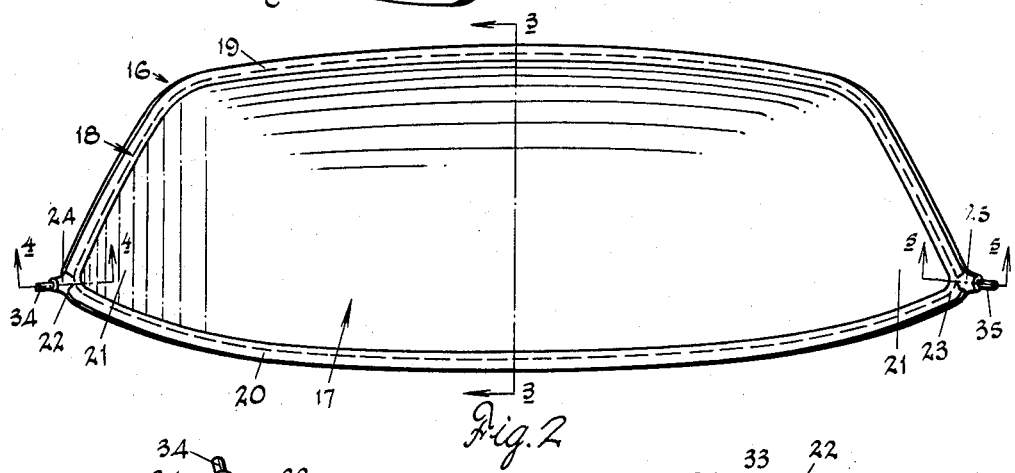
Fig. 2
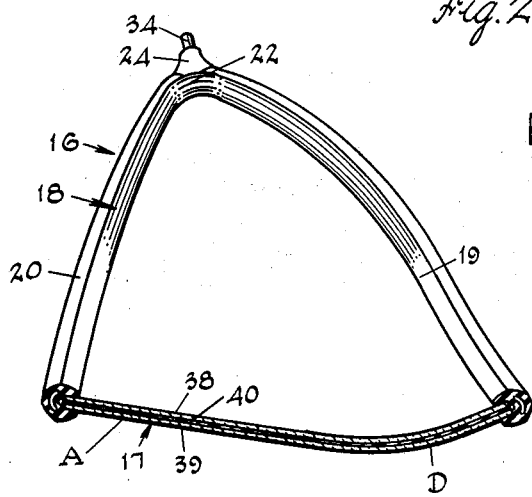
Fig. 3
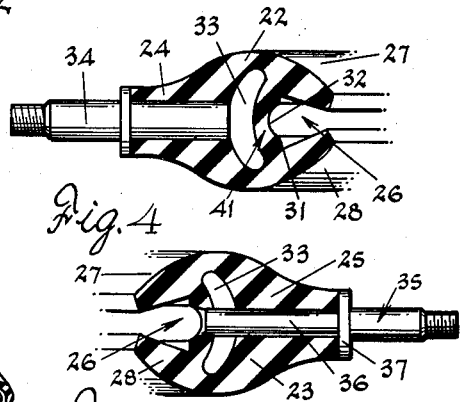
Fig. 4
Fig. 5
INVENTOR.
James H. Boicey
BY
Nobbe & Swope
ATTORNEYS May 3, 1966  J. H. BOICEY  3,249,479
PRESSING GLASS-PLASTIC SANDWICHES
Filed Oct. 21, 1957  2 Sheets-Sheet 2

INVENTOR.
James H. Boicey
BY Nobbe & Swope
ATTORNEYS

United States Patent Office 3,249,479
Patented May 3, 1966

3,249,479
PRESSING GLASS-PLASTIC SANDWICHES
James H. Boicey, Toledo, Ohio, assignor to Libbey-Owens-Ford Glass Company, Toledo, Ohio, a corporation of Ohio
Filed Oct. 21, 1957, Ser. No. 691,202
7 Claims. (Cl. 156—83)

This invention relates broadly to laminated safety glass, and more particularly to an improved method and novel apparatus for preliminarily pressing assembled layers of glass and plastic together in the production thereof.

Briefly stated, laminated safety glass is made up of two or more sheets or plates of glass with an interposed layer or layers of nonbrittle plastic material, all bonded together under the influence of heat and pressure to form a composite, transparent structure. In the manufacture of this type of glass, it is customary to first assemble the various layers or laminae in proper superimposed relationship to form a sandwich of glass and plastic; to then prepress the assembly to drive out entrapped air and moisture from between the various layers and to give a preliminary adhesion, and then to finally and permanently bond the several layers together by subjecting the assembly to the combined action of heat and elevated pressure in an autoclave.

In one well known commercial method of manufacture, a roll-type press having rubber-surfaced rolls is used to prepress the so-called "sandwich." Such a roll-type press has been found quite satisfactory even in the manufacture of curved laminated safety glass and it has been usual to first pass the curved glass-plastic laminae through one set of rolls, to then heat the sandwich, and then to again pass it between a second set of rolls.

In fact a form of this general procedure has been successfully used in prepressing the now popular so-called "panoramic" windshields which are so severely curved as to provide vision at the forward corners as well as across the front of the car. However, with the further streamlining of automobiles, these panoramic windshields have lately been redesigned to extend upwardly and then sweep back in a smooth curve to blend into the roof panel of the car to produce what is now aptly termed a "cap" windshield.

Such an extreme windshield construction involves severe bends about both major axes of the glass sheets used to produce it. In other words, the usual longitudinal bends about the transverse axis of the sheets are necessary to form the centrally disposed shallow curvature and the sharply curved end sections as in the prior panoramic windshields. In addition a severe bend about the longitudinal axis of the sheets is required to form the curvature of the so-called "cap" portion; and this makes the prepressing of such windshields with roll-type presses a virtual impossibility.

The chief aim of this invention is therefore to provide an improved method and apparatus for pressing a glass-plastic assembly which includes curvatures in both of its axes.

Another object is to provide an improved method for pressing glass-plastic assemblies by atmospheric pressure.

Another object of the invention is to provide a method for pressing a glass-plastic assembly as above described which includes heating of the assembly during application of the atmospheric pressure.

Another object is to provide a method for pressing glass-plastic assemblies curved in both of their axes and wherein means is employed for firmly and sealingly gripping the peripheral edge of such an assembly during the development of an evacuated condition in said assembly.

Another object of the invention is to provide a flexible preliminary pressing apparatus adapted to be freely moved over the edge of a glass-plastic assembly while in a substantially expanded condition and to clampingly grip the said assembly when in a collapsed condition.

A further object is the provision of an endless ring-type apparatus for pressing glass-plastic assemblies which apparatus has a continuous edge-receiving channel and means for expanding said channel to receive the peripheral edge of a glass-plastic assembly and with said channel being adapted to maintain an evacuated condition around the peripheral edge and throughout the said assembly when the channel is released from the influence of said expanding means.

A further object of the invention is to provide an endless ring-type apparatus of the above character wherein means integrally attached to said apparatus is adapted to increase the effectiveness of the clamped relation between said apparatus and the said sandwich.

A still further object is to provide an apparatus of the above character wherein means is included for increasing the clamped relation between the apparatus and a glass-plastic sandwich by pneumatic pressures.

Other objects and advantages of the invention will become more apparent during the course of the following description when read in connection with the accompanying drawings.

In the drawings, wherein like numerals are employed to designate like parts throughout the same:

FIG. 1 is a perspective view of a laminated glass-plastic windshield as produced in accordance with this invention;

FIG. 2 is a plan view of the glass-plastic assembly for the windshield of FIG. 1 with a pressing apparatus mounted thereon;

FIG. 3 is a transverse sectional view taken on line 3—3 of FIG. 2;

FIG. 4 is a cross-sectional detail view taken on line 4—4 of FIG. 2;

FIG. 5 is a similar cross-sectional detail view as taken on line 5—5 of FIG. 2;

Figure 6:
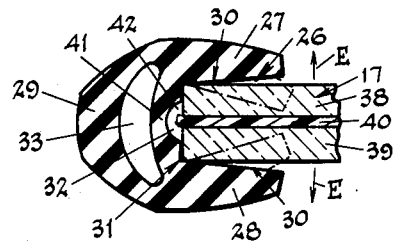
FIG. 6 is a cross-sectional view of the glass-plastic assembly of FIGS. 2 to 5 showing the pressing apparatus being positioned thereon.

Briefly stated the invention illustrated in the drawings and to be here-in-after described is carried out by first fitting a flexible channeled member or ring in sealing relation around the periphery of a glass-plastic sandwich to be prepressed. By creating a vacuous condition within the channeled member, entrapped air is exhausted from between the several layers of the sandwich and this operates to bring the surfaces of the plastic interlayer into more intimate relation with the opposed glass surfaces. At the same time residual vapors will be withdrawn from the thermoplastic material and the resulting evacuated condition throughout the total area of the sandwich reduces the pressure within the assembly to as near zero as is practically possible. This produces a differential of pressure between the inside of the assembled sandwich and the atmosphere outside the sandwich and permits the atmospheric pressure on the outside surfaces of the sandwich to become instrumental as a pressure medium and to distribute an even pressure on the outside surfaces. A satisfactory edge seal is thus obtained and it has been found that a preliminary pressing of the glass plastic sandwich has been effected throughout the entire body thereof.

Referring now more particularly to the drawings, there is shown in FIG. 1 a so-called "cap" windshield 15 in which there is combined the advantageous features of the presently popular panoramic type of windshield with the more recently developed upwardly extended, curved cap portion for increased viewing areas. A windshield of this modern character has a lower portion A which includes a central section B of substantially shallow curvature and rather sharply rearwardly curved end sections C. These sections are bent in the longitudinal axis of the windshield and about the transverse axis thereof. On the other hand, the upper portion of this particular embodiment of a windshield is curvedly swept back by bending the glass sheets about the longitudinal axis thereof, as indicated by the letter D, to produce a cross-curvature in the transverse axis. This may be seen in FIG. 3 of the drawings as well. Such a windshield is accordingly bent to not only enclose the forward opening of an automobile but is simultaneously shaped to curve upwardly and blend into the roof panel of the vehicle.

In the past certain special laminated glass units have been prepressed by enclosing the glass-plastic sandwiches in an evacuated envelope to carry out the initial pressing and to protect the assembly during final pressing. However, this is an involved and laborious operation which does not lend itself to the commercial production of automotive windshields. Thus, in practicing the "bag" method the bent glass sheets and plastic interlayer were usually laid upon a sheet of flexible material, such as cellophane and covered with a second sheet of the same material. These sheets then had to be heat-sealed about the perimeter of the sandwich and the resulting envelope then had to be evacuated and this necessitated heat sealing a special valve into each envelope. In addition to being time-consuming and expensive, this procedure was highly wasteful since the envelope cannot be reused but must be scrapped.

According to the invention on the other hand, a flexible apparatus or ring 16, as shown in FIGS. 2 and 3, is positioned around the periphery of a glass-plastic laminae or sandwich 17. The ring 17 is preferably of an extruded rubber formation which has a suitable hardness of between 55 to 60 durometer. The ring is conventionally produced in an endless form by being vulcanized in a mold substantially of the same outline as the windshield with which it is to be used. The ring 16 thus comprises a substantially endless body 18 formed by a generally "U" shaped side 19 that is considerably longer than the other side 20 thereof. In the formation of the endless ring 16, these two sides are integrally united as at 22 and 23 and the areas 22 and 23 are provided with outwardly projecting bosses 24 and 25 respectively for purposes to be herein particularly described.

The body portion 18 of ring 16 as shown in FIGS. 4, 5 and 6, is substantially C-shape in cross-section to provide a sandwich receiving channel 26. The channel 26 is formed by two outwardly directed end portion lips or legs 27 and 28 that project from a relatively thick or rigid web portion 29. More especially, this channel has two opposed wall surfaces 30 and a rear or inwardly disposed wall surface 31, the plane of which, in use, is substantially normal to either of the wall surfaces 30. The wall surface 31 is provided with a semicircular groove 32. In the web 29 of body 18 and behind the channel wall surface 31, there is a hollow passageway 33 which is substantially continuously formed in the sides 18–19 and ends areas 22–23 of ring 16. The passageway 33 is intended to receive air under pressure and for this purpose as will be seen in FIG. 4, communicates with a well-known type of valve 34 located in the boss 24 of ring end area 22.

In the boss 25, there is contained a valve member 35 in communication generally with the channel 26. In FIG. 5, it will be seen that the stem 36 of valve member 35 projects through the passageway 33 and that a flange 37 is provided thereon which abuts the outer surface of the boss 25. This flange is adapted to prevent the valve member 35 being accidently forced inwardly which, during use of the ring 16, might damage the adjacent edges of the sandwich should the inner end of the member be struck thereagainst. The valve member 35 is adapted to be externally connected to a source of vacuum as will be presently more clearly set forth.

The glass-plastic laminae 17 consists of two glass sheets 38 and 39 together with a plastic interlayer sheet 40 which are assembled in a suitably conditioned room and are then ready for assembly with a ring 16. For this purpose, a supply of air under pressure, for example of about 40 p.s.i., is connected to the valve member 34 so as to put the passageway 33 under pressure and cause a definite distortion of the ring body 18. This is produced by the relative thinness of the web 41 between the channel 26 and passageway 33 with a consequential bulging of the web outwardly. Such bulging or distention of the web causes curvature of the wall surface 31 and is evidenced in the separation of the legs 27 and 28, as shown in FIG. 6, and generally the opening of the channel 26 as indicated by the arrows E.

In mounting the ring 16, the sides 19 and 20 thereof are arranged with the channel 26 directed, as closely as possible toward the edge of the sandwich 17, it is intended to receive. Now the ends 22 and 23 of the ring, which contain the valve members 34 and 35 are positioned at the extreme ends 21 of the laminae 17 and the proximate edges thereof are inserted into the channel 26. Working inwardly toward the central area of the sandwich 17 and from these extreme end areas, the edges of said sandwich are progressively fitted into the continuous channel 26 and between the legs 27 and 28, until the assemblage appears as illustrated in FIGS. 2 and 3. The air pressure is then removed from valve member 34.

To collapse the legs 27 and 28 into a relation of substantially sealing engagement with the surfaces of the glass sheets 38 and 39, the conventional valve plunger of valve member 34 is depressed to permit exhaustion of air from the passageway 33 thereby allowing the body 18 to relax or contract to substantially its normal cross-sectional formation. This causes the legs 27 and 28 to collapse and by moving inwardly, or toward one another, actively clamp or grip the outer surfaces of the glass sheets 38 and 39. By reason of the conformity of the flexible molded ring 16 to the outline of the laminae as well as the bent curvature thereof, the surfaces 30 of the legs 27 and 28 are adapted to provide an effective and substantially complete seal thereabout. At the same time it is to be pointed out that the perpendicular edges of glass sheets 38 and 39 are disposed in substantially abutting relation with the channel wall surface 31 and so as to definitely create a closed chamber 42 at the groove 32. The valve member 35 is then connected to a source of vacuum.

The completeness of seal of the ring 16 is preferably carefully inspected and the condition of the vacuum in chamber 42 denoted by a suitable gauge to be in the order of 22 or 23 inches of mercury. A preliminary period of evacuation is carried out for approximately one minute during which interval entrapped air and moisture are withdrawn from between the layers of glass and plastic.

More especially, while the vacuum is maintained, the residual vapors and the pressures thereof are withdrawn from the thermoplastic material. An optimum condition of course to be achieved is the reduction of atmospheric pressure within the glass-plastic sandwich to a zero pressure. This enables the outside atmospheric pressure to carry out a substantially equalized pressing action against the outer surfaces of the glass sheets since a differential of some 14 p.s.i. is created. The laminae is then heated.

Figure 8:
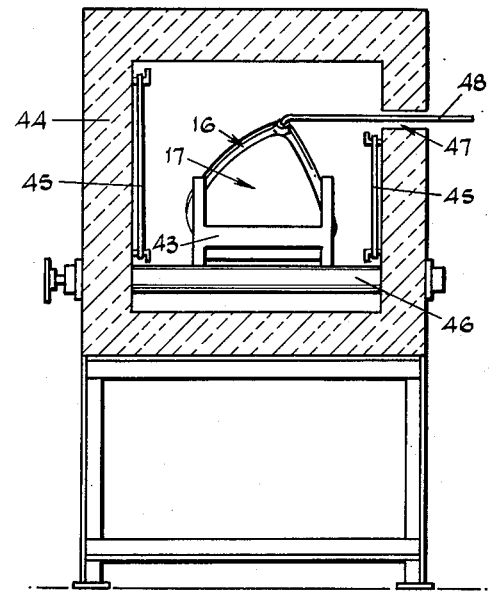
FIG. 8 is a transverse vertical detail view of one form of heating oven.

For this purpose, the laminae is placed upon a suitable rack 43 and passed through an oven 44. As shown somewhat diagrammatically in FIG. 8, such an oven 44 may be of the tunnel type and heated by suitable electric units 45. The rack 43 is placed on conveyor 46 which is driven at a convenient rate of speed such as 19 f.p.m. or so that the laminae will be subjected to a heated atmosphere of 600° F. for substantially two and one-half minutes. If desired, although not necessarily, one wall of the oven 44 may be provided with an elongated, horizontally disposed opening or slot 47 through which the tubing 48 to the vacuum source can be passed during movement of the rack and supported laminae through the oven.

During the heating cycle, the sandwich 17 is continuously influenced by the vacuous condition therein and, as the thermoplastic interlayer becomes softened and somewhat tacky, it is caused to freely adhere to the opposed glass surfaces. Since a differential of pressure is still existent during this interval, the normal atmosphere pressure acting upon the outer surfaces of the glass sheets is adapted to substantially press the glass sheets into complete contact with the softened interlayer throughout their surface areas of contact. Upon completion of the heating cycle, the vacuous condition is maintained for a further interval of about one minute. The preliminary pressing of the glass-plastic laminae will now be evidenced by the more or less reduced translucent appearance thereof and the vacuum connection is discontinued at the valve member 35. The ring 16 is then removed and, for rapid disengagement if desired, air may again be introduced into passageway 33 to produce separation of the legs 27 and 28 as is indicated in FIG. 6.

Figure 9:
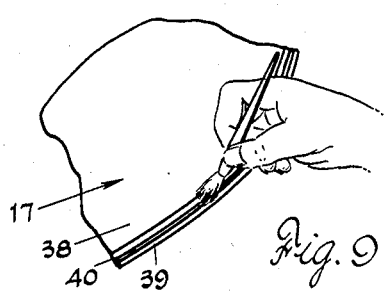
FIG. 9 is a fragmentary perspective view of an edge treating operation in the laminating process.

The laminae is now prepared for the actual laminating operation which is conventionally carried out in the well-known auto-clave and under the influence of pressure exerted by heated oil supplied thereto. However, before the glass-plastic laminae or sandwich is subjected to this final lamination step, it has been found advantageous to coat the edges thereof with a solution such as tributylphosphate. Such a procedure, it has been found, can be easily and effectively carried out by brushing on of the solution as shown in FIG. 9. This composition reacts with the exposed border of the interlayer to cause a swelling thereof which substantially seals the surfaces of the plastic to the adjoining edges of the glass sheets and consequently operates to prevent the introduction of oil into and between the glass and plastic surfaces. The objectionable entry of oil is known to produce defective areas in the finished laminated structure and which are known to the art as "blow-ins."

Now when the glass-plastic sandwich is satisfactorily prepared for the final laminating step, the edge ring 16 is adapted to be returned to the area of installation where, with substantially little wear, it is available for later use. It will thus be seen that in carrying out the embodiments of this invention, an improved method is provided for the preliminary pressing of glass-plastic laminae which include curvatures bent through both axes thereof. More than this, such a method when employing the novel apparatus described hereinabove, enables the pressing operation to be rapidly performed continuously and at a relatively low expense of maintenance.

Since the pliable characteristics of rubber and like materials are of common knowledge it is quite apparent that the legs portions 27 and 28 of the ring body 18 will normally tend to return to an original physical positioning, as shown more or less arbitrarily in FIGS. 4 and 5, when released from a distorting force. This tendency has been found, under circumstances of practical use, to afford an efficient clamp or seal between the outwardly directed surfaces of the glass sheets and the wall surfaces of the channel of the ring. However, to positively direct the leg portions of a prepressing ring as herein disclosed, downwardly into such a sealing relation, it may be found advantageous to literally "wedge" the said legs. Accordingly, provision is herein made and after the air pressure is reduced in the passageway 33, to force the legs into the desired relation of sealing engagement at the interfaces of the glass and the rubber ring.

Figure 11:
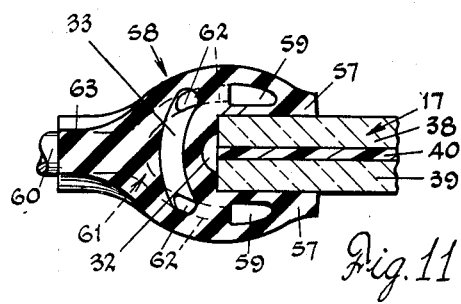
FIG. 11 is a cross-sectional view of a further modified form.
Figure 10:
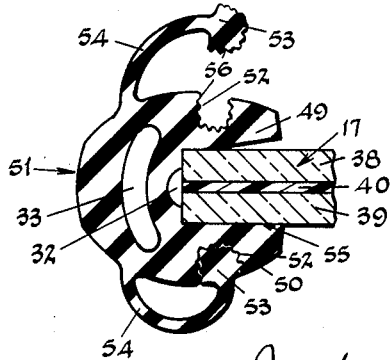
FIG. 10 is a cross-sectional view of a modified form of pressing apparatus.

For this purpose, modified forms of extrudable structures are shown in FIGS. 10 and 11. Each structure carries out this object; one by means of an insertable element and the other by the application of air pressure. Thus, as shown in cross-sectional detail in FIG. 10, the leg portions 49 and 50 of the modified ring 51 are provided with especially formed channels 52. Each channel, it will be understood, is continuous through the body of the ring and is adapted to receive an enlarged bead 53 that is integrally connected to the ring body by a flexible web 54. These related parts are of course produced by extrusion of the basic material in a manner well known in the art.

Figure 7:
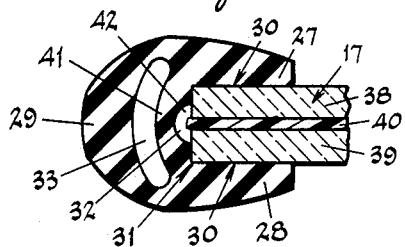
FIG. 7 is a similar sectional view of the glass-plastic assembly with the apparatus positioned for the pressing operation.

In assembling the modified form of ring with a glass-plastic sandwich, the same procedure is carried out as has been above described in connection with ring 16 (FIGS. 6 and 7). Now when the air pressure is reduced in the passageway 33, the bead 53 associated with the legs 49 and 50 will be disposed substantially as shown in FIG. 10 in the upper part of said figure and the channel 52 therein generally collapsed as indicated. However, upon insertion of the beads 53 into their associated channels 52 as shown in the lower part of the figure at the leg portion 50, the wall surfaces 55 of the legs will be urged effectively against the surfaces of the sandwich. This insertion or inward "tucking" of the bead is a continuous operation about the ring 51 since the bead in each case is a substantially endless element. And although not especially essential to satisfactory interfitting of the bead 53 with an associated channel 52, it may be found preferable to provide the surfaces of the bead element and the channel with corrugations as indicated at 56. This will prevent the inadvertent slipping of the respective surfaces relative to one another which might tend to "work" the bead from the groove when the ring and sandwich are subjected to normally expected handling.

Figure 12:
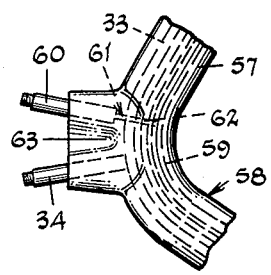
FIG. 12 is a fragmentary view of the modified form shown in FIG. 11.

As illustrated in FIGS. 11 and 12, the further modified embodiment of the prepressing ring structure involves the use of secondary air pressure passageways. According to this construction, the leg portions 57 of the ring 58 are each provided with a passageway 59 in the body thereof. The passageways 59 are continuous throughout the body of the ring 58 and can be connected to a source of air under pressure through a valve member 60. This particular member 60 has an inwardly disposed yoke portion 61 which is generally shaped like the well-known "wishbone." The yoke 61 is embedded in the body of the ring and the extensions 62 thereof pass through the passageway 33 and terminate in the passageways 59.

As shown in FIG. 12, the ring 58 is provided with a valve member 34, as previously described in connection with the ring 16, for the purpose of opening of the channel 26 during assembly with a glass-plastic sandwich 17. Thus the valve member 34 and the valve member 60 are embedded in a boss 63 projecting outwardly from the end 22 of the ring; said boss 63 being of suitable size to accommodate both of said valve members.

In carrying out the method of this invention, the ring 16, or the modified ring structures 51 or 58, is situated about the perimeter of a glass-plastic sandwich 17 and in its pliable or flexible condition is arranged so that the continuous channel 26 therein is directed toward the peripheral edge of the sandwich. Air pressure is applied to the passageway 33 through the valve member 34 until the leg portions of the ring are spred apart as shown in FIG. 6. The ends 22 and 23 of the ring are then placed over the oppositely disposed ends 21 of the sandwich 17 after which the sides of the ring are progressively slipped over the edges of the sandwich. This has been found in practical use, to be an exceedingly simple operation adaptable to desired production schedules and can be rapidly carried out by operators jointly working from the opposite ends of the sandwich.

Upon completion of the mounting of the ring, the air pressure in passageway 33 is reduced in the well known manner by downward pressure on the contained valve pin or plunger. In the preferred embodiment of the invention as shown in FIG. 7, the sealed engagement between the surfaces 30 of legs 27 and 28 and the glass is at once effected and ready inspection can be made. However, in the instance of the modified ring 51 having a cross-section as shown in FIG. 10, the continuous bead element 53 is tucked or inserted into the associated channel 52. In this case, the positioning of each bead 53 expands the respective channel 52 to firmly position the legs 49 and 50 sealingly against the glass surfaces. On the other hand, if the modified structure of FIGS. 11 and 12 are employed, air pressure is directed through valve member 60 to the passageways 59 to achieve the same objective.

In any of these procedures, when the ring has been adequately attached to or assembled with the sandwich, the valve member 35 is connected to a source of vacuum which through the chamber 42 acts to exhaust entrapped air, moisture and residual vapors from between the glass sheets and the interlayer of plastic.

Also, as previously stated, the vacuous condition developed in the chamber 42 produces a reduction of atmosphere pressure between the several layers of the sandwich. This creates a differential of pressure between that within the sandwich and the normal atmospheric pressure acting against the outer surfaces thereof. Since the pressure between the glass sheets and the plastic interlayer is reduced to a minimum, the outer pressure acting upon the outer surfaces of the sheets is adapted to literally press the glass sheets into satisfactory contact with the plastic interlayer.

According to the present method, evacuation is initially carried out for an interval of a minute, more or less. The assembled ring and sandwich are now passed through a heated atmosphere of 600° F., as in an oven 44 having a conveyor 46, for approximately two and one-half minutes. The purpose for subjecting the sandwich to heat is to render the plastic interlayer somewhat tacky whereby it adheres to the glass surfaces and especially in the vicinity of the legs of the ring which are sealingly or physically clamped to the edge surfaces of the sandwich. Upon removal of the sandwich from the oven, the evacuated condition is maintained for a short interval as for one minute to complete the effectiveness of the preliminary pressing as the sandwich cools to normal temperature. The ring is then removed and the sandwich is ready for the final phases of the laminating operation.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A method of pressing together the laminae of glass plastic sandwiches which comprises the steps of covering the margins and edge portions of said sandwiches, withdrawing air from between said sandwiches at said covered edges to permit atmospheric pressure to press the laminae of said sandwiches together, uncovering said margins and edge portions of the sandwiches, applying to the edges of said sandwiches a material that will cause the plastic lamina of the sandwich to swell, and finally exposing said sandwich while uncovered to the action of a heated liquid under pressure.

2. A method as defined in claim 1 in which the glass-plastic sandwiches are heated while the edges and margins are covered.

3. In an apparatus for pressing together an assembly of glass and plastic sheets forming glass-plastic sandwiches, the combination of, an endless solid ring member of resilient material, said member having a body portion, a pair of substantially parallel readily deformable legs outwardly extending from said body portion and disposed to form with said body portion a continuous outwardly open facing channel shaped to embrace the periphery of a glass-plastic sandwich when placed within said channel, a groove recessed into said body portion, between said legs, in open communication with said channel and surrounding the entire periphery of a sandwich when placed in said channel and a hollow endless passageway formed within said body portion and being substantially parallel to the channel completely throughout the contour of said body member, pressure means communicating with said passageway for outwardly deforming said legs with respect to each other whereby to open the channel and to facilitate entry of the marginal area of the sandwich into the channel so that the outer edges thereof rest in abutting position against said body member to define with said groove a closed chamber, said last mentioned means including additional means selectively operable to urge said legs to assume a clamping position against the juxtaposed surfaces of the marginal edge areas of the sandwich after a sandwich is placed within the channel and vacuum means communicating with said groove, constituting the closed chamber, to evacuate air from the closed chamber and from the space between the layers of the sandwich in proximity to the marginal edge areas of the sandwich clamped between said legs.

4. In an apparatus as defined in claim 3, wherein said additional means includes, a valve having a stem in open communication through said body member with said passageway to permit exhaustion of air introduced by said pressure means from said passageway whereby to urge said legs into clamping position onto the glass-plastic sandwich.

5. In an apparatus as defined in claim 3, wherein said vacuum means communicating with said groove includes, a valve member having a stem projecting through said body member and through said passageway so that the inner end of said stem is in open communication with said groove and the outer end of said stem is in communication with a source of vacuum to evacuate air from said groove and a flange member on said valve stem abutting said body member to hold said stem substantially immobile within said body member.

6. In an apparatus as defined in claim 4, a pair of hollow secondary passageways, one provided within each of said legs and adapted to be simultaneously connected to a source of fluid pressure independently of said first-mentioned passageway.

7. The method of treating an assembly comprising two glass sheets and a thermoplastic interlayer to bond the interlayer to the glass sheets substantially throughout the entire area, which comprises providing a vacuum substantially only at the periphery of the assembly to remove vapors trapped between the interlayer and the glass sheet, heating the assembly to an elevated temperature while maintaining a vacuum at the periphery of the assembly to bond the interlayer to each glass sheet in at least its marginal area, discontinuing the application of said heat and vacuum and applying to the edges of said assembly a material that will cause the thermoplastic interlayer to swell, and finally exposing the entire assembly to the action of a heated liquid under pressure whereby the interlayer is bonded to the glass sheets substantially throughout the entire area of the assembly.

References Cited by the Examiner

UNITED STATES PATENTS

| | | | |
|---|---|---|---|
| 504,890 | 9/1893 | Ohmart. | |
| 1,732,022 | 10/1929 | Lytle | 154—2.7 |
| 1,734,379 | 11/1929 | Hitchcock | 154—2.71 |
| 1,870,284 | 8/1932 | Drake | 154—2.7 |
| 2,430,873 | 11/1947 | Haas | 20—56.4 |
| 2,492,566 | 12/1949 | Geyer | 20—56.4 X |
| 2,673,822 | 3/1954 | Dennison et al. | |
| 2,700,196 | 1/1955 | Panhard | 20—56.4 |
| 2,700,632 | 1/1955 | Ackerlind | 154—110 |
| 2,948,645 | 8/1960 | Keim | 154—27 |

EARL M. BERGERT, *Primary Examiner.*

JAMES S. BAILEY, JACOB LIEBOWITZ, CARL F. KRAFFT, *Examiners.*

J. P. BURKE, W. F. ZAGURSKI, W. J. VAN BALEN, *Assistant Examiners.*